June 3, 1952 I. H. GERKS 2,599,381

AXIS CONVERTER

Filed Jan. 21, 1950 3 Sheets-Sheet 1

INVENTOR
IRVIN H. GERKS
Marvin Moody
ATTORNEY

June 3, 1952 I. H. GERKS 2,599,381

AXIS CONVERTER

Filed Jan. 21, 1950 3 Sheets-Sheet 2

INVENTOR
IRVIN H. GERKS
Marvin Moody
ATTORNEY

June 3, 1952 I. H. GERKS 2,599,381

AXIS CONVERTER

Filed Jan. 21, 1950 3 Sheets-Sheet 3

INVENTOR
IRVIN H. GERKS
Marvin Moody
ATTORNEY

Patented June 3, 1952 2,599,381

UNITED STATES PATENT OFFICE 2,599,381

AXIS CONVERTER

Irvin H. Gerks, Cedar Rapids, Iowa, assignor to Collins Radio Company, Cedar Rapids, Iowa, a corporation of Iowa Application January 21, 1950, Serial No. 139,940

7 Claims. (Cl. 318—19)

This invention relates in general to axis converters, and in particular to an apparatus for converting from a celestial system to an altitude-azimuth system.

Man finds that it is desirable at times to make a study of the movement of celestial bodies. Such studies oftentime necessitate the use of telescopes or other scanning means. Many of the scanning means used for tracking celestial bodies are very large and heavy, thus presenting a problem of obtaining mechanical structures strong enough to support them for free movement. Different systems have been devised for supporting large telescopes, or other scanning apparatus, but perhaps none are so well adapted to mechanical simplicity as the so-called alt-azimuth system. The alt-azimuth system comprises supporting means which contain an axis parallel to the surface of the earth, called the altitude axis, and a second axis vertical to the surface of the earth, called the azimuth axis. When an alt-azimuth mounting is used for supporting a tracking apparatus, it is necessary to allow rotation about both axes simultaneously, and the resulting motion of the respective axes with respect to time is complicated. If celestial tracking apparatus is mounted on a system of polar axes, a celestial body may be tracked by allowing movement on only one axis—the polar one. This is true because a celestial body moves with a constant declination.

It is an object of this invention, therefore, to provide an axis converter which will control a heavy celestial-body-tracking apparatus mounted on an alt-azimuth type mounting by means including a polar axis system with an inherent alt-azimuth conversion mechanism attached thereto.

Another object of this invention is to provide an axis converter which will convert polar axis positions to alt-azimuth positions and electrically control a master celestial body-tracking device mounted on an alt-azimuth set of axes.

Another object of this invention is to provide an apparatus for automatically tracking a celestial body.

A feature of this invention is found in the provision for an axis converter which converts polar axis positions to alt-azimuth axis positions, and thus controls a master scanning device mounted on an alt-azimuth axis.

Further objects, features, and advantages of this invention will become apparent from the following description and claims, when read in the light of the drawings; in which Figure 1 illustrates the axis converter of this invention electrically connected to driving means for controlling the scanning device mounted on an alt-azimuth system of axes;

Figure 1:
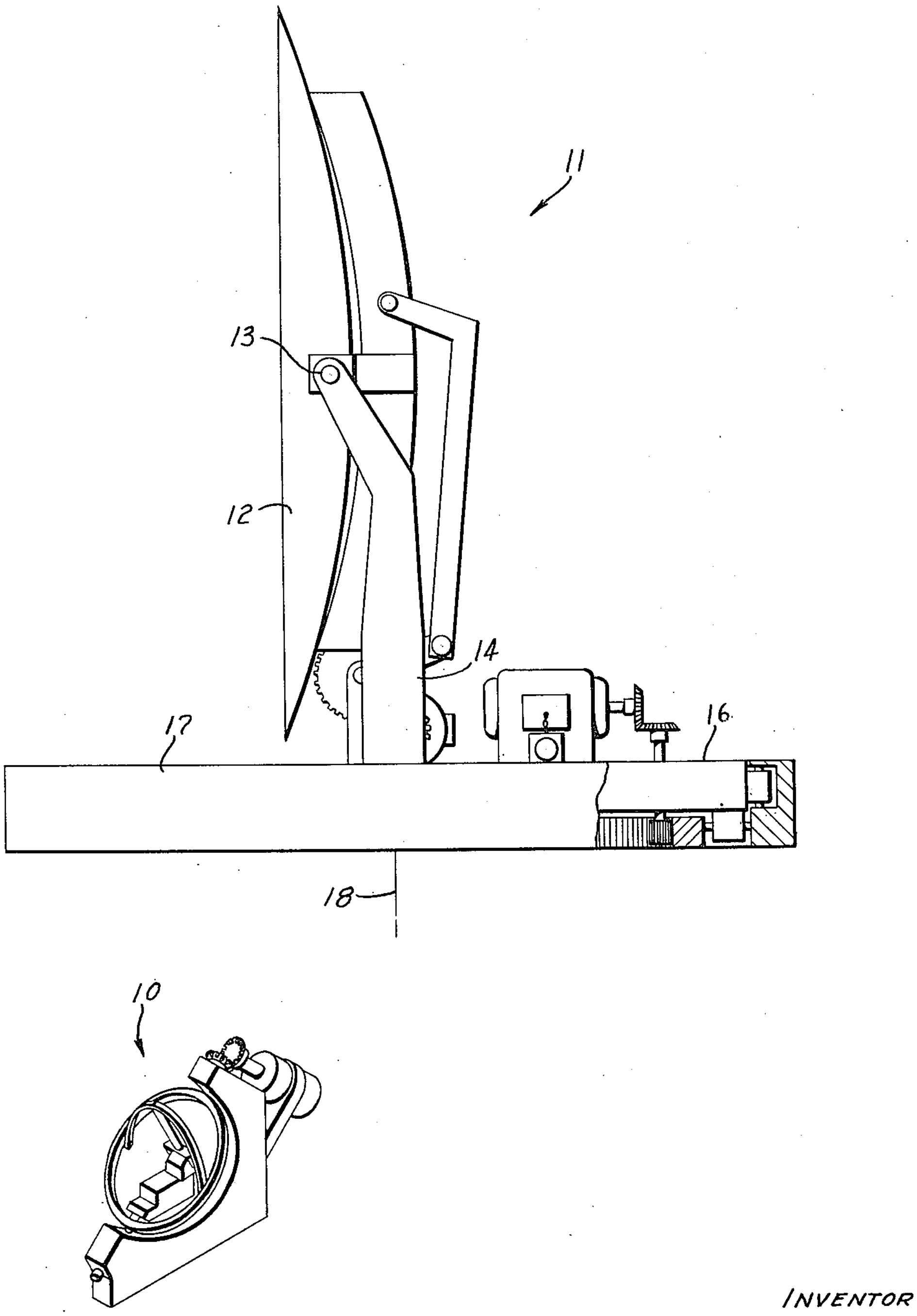
Figure 4:
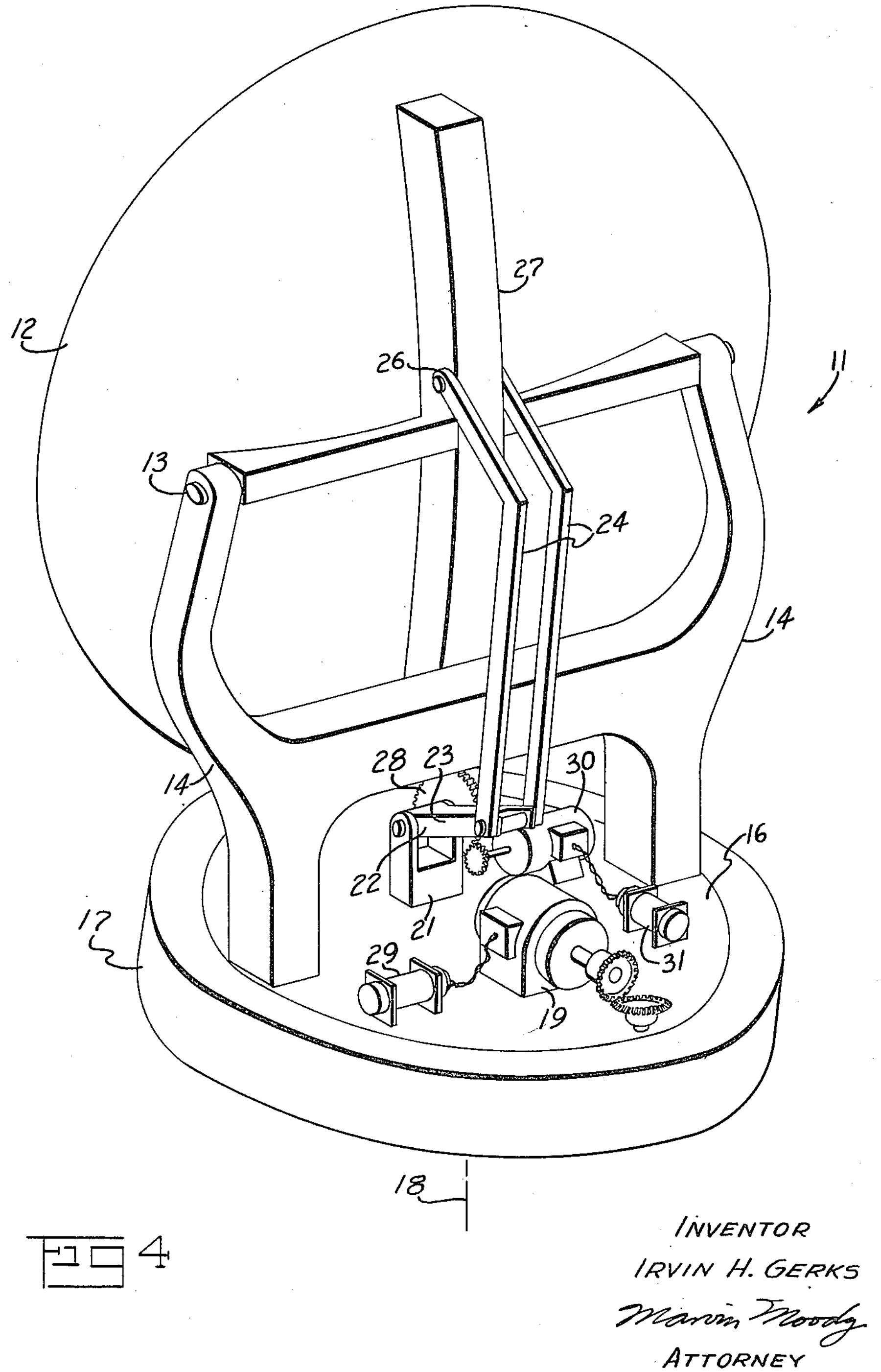
Figure 4 is an enlarged perspective view of the controlled scanning apparatus.

Figure 1 illustrates an axis converter, designated generally as 10, electrically connected to the controlled device, designated generally as 11. The controlled device comprises a focusing dish-type anenna 12 mounted on a horizontal, or elevational, axis 13 passing through the supports 14. Supports 14 terminate on a base 16 which is pivotally supported on roller bearings, or other suitable means, on a stationary member 17. The base plate 16 may be rotated relative to the stationary member 17, and thus the antenna 12 is mounted for motion about the vertical axis 18 and the horizontal axis 13. A motor 19 is mounted on the base plate 16 and is connected to a suitable gear train for moving the antenna structure about the vertical axis. As shown in Figure 4, mounted between the supports 14 is a bracket 21. A lever 22 is pivotally connected to the bracket 21, and its opposite end 23 pivotally connects with the lower end of a rocker arm 24. The upper end 26 of the rocker arm 24 is connected to the antenna support 27 and thus means are provided for rotating the antenna 12 in response to motion of the lever 22. Suitable driving means, such as electric motor 30, is geared to the lever arm 22 through the gear train 28 for rotating the antenna about the horizontal axis.

It is to be understood that a celestial telescope or any other type of antenna may be mounted on the horizontal and vertical axes of this system and the antenna is used for illustrative purposes only.

It is desired to track a celestial body which maintains substantially constant declination. The vertical-axis driving motor 19 is electrically connected to a controlling servo-mechanism 29 and the horizontal axis actuating motor 30 is controlled by servo-mechanism 31.

In order to track a celestial body with apparatus mounted on a vertical and horizontal axis, it is necessary that motion occur about both axes simultaneously. The equations for the motion of the axis are not simple and very complicated circuitry would be required to automatically solve the tracking problem.

The relationship between polar axis systems and alt-azimuth systems is given by the equations:

$$\sin h = \sin L \sin \alpha + \cos L \cos \alpha \cos \epsilon \quad (1)$$

and $$\sin Z = \frac{\cos \alpha \sin \epsilon}{\cos h} \quad (2)$$

where $h$ is the elevation angle, Z is the azimuth angle, $\alpha$ is the declination angle, L is the latitude of the observer's position, and $\epsilon$ is the hour angle measured from the observer's meridian.

Figures 2, 3:
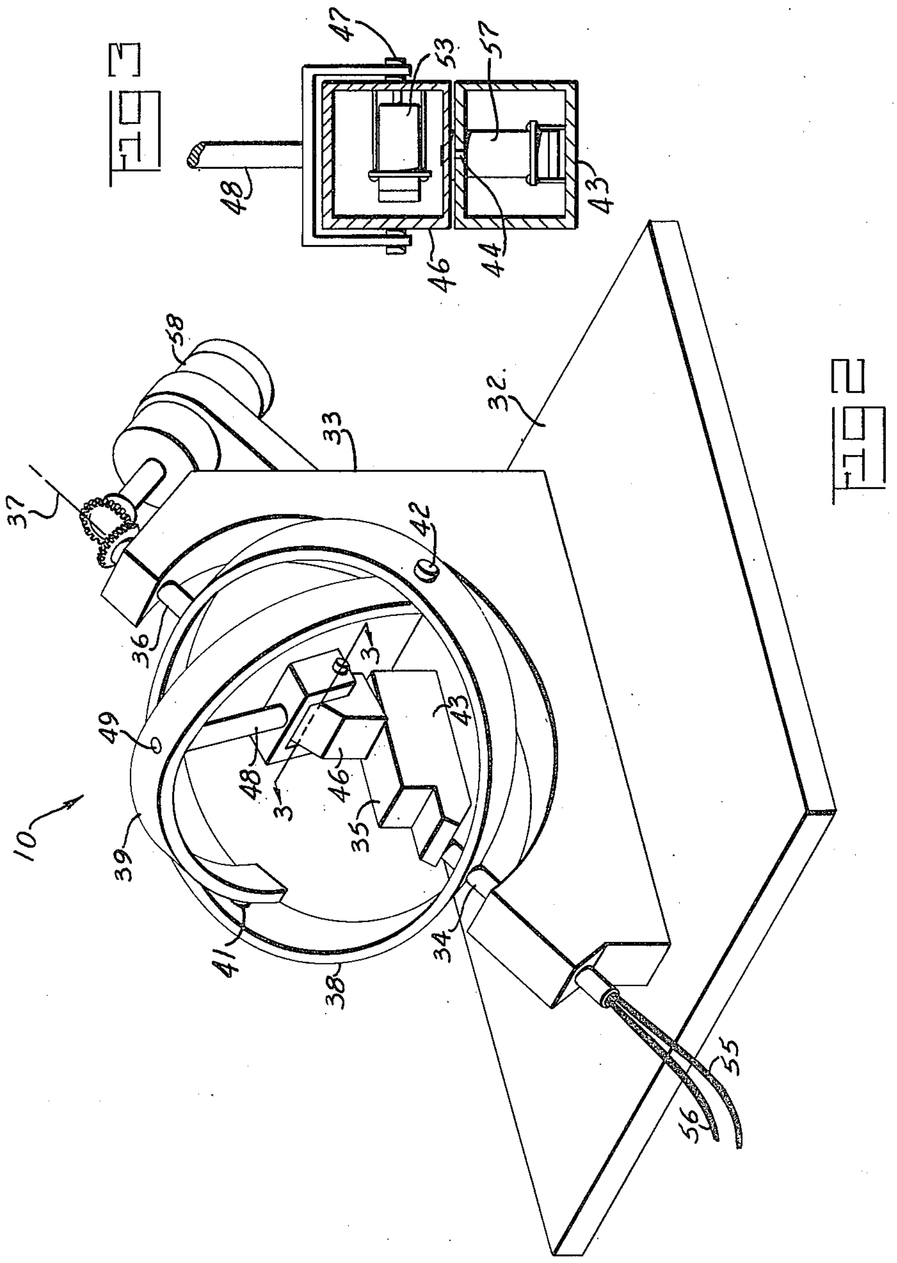
Figure 2 is an enlarged perspective view of the axis converter of this invention.
Figure 3 is a sectional view taken on the line 3—3 of Figure 2, and illustrates the axis-pickoff means.

I have solved this problem by using the controlling device illustrated in Fig. 2 which comprises a base plate 32 upon which is mounted a generally crescent-shaped polar axis support 33. The polar axis support 33 receives the shafts 34 and 36 adjacent the ends of the crescent. These shafts are mounted so as to be in axial alignment and parallel to the polar celestial axis. To accomplish this the polar axis support 33 must maintain the polar axis 37 at an angle $\theta$ with the horizontal surface 35 of the alt-azimuth assembly. This angle corresponds to the latitude of the geographic position of the tracking mechanism and also the polar axis must point northward. Thus if the tracker is to be mobile, it is desirable to provide means for varying the angle $\theta$. This may be done in known manners and will not be described in detail here. For a more detailed description of means for accomplishing this, reference may be made to Patent 2,466,225 which issued to Gee on April 5, 1949, entitled "Astralabe." It is interesting to note that the latitude adjustment need only be made on the axis converter 10 in that the controlled unit 11 is mounted on vertical and horizontal axes.

Supported between the shafts 34 and 36 is a ring 38. The shaft 36 is rigidly connected to the ring and the shaft 34 is pivotally connected to it. Pivotally supported at the mid point between the shafts 34 and 36 of the ring 38 is a semi-annular member 39. The axis passing through the pivot points 41 and 42 of the semi-annular member corresponds to the declination axis. Stated otherwise, when semi-annular member 39 is adjusted to form a right angle with the ring 38 the declination is zero and the semi-annular member 39 lies in a plane parallel to the celestial equator. When the semi-annular member is moved northwardly from this zero declination position, the declination increases and is equal to the angle between the zero declination position and the new position. If the semi-annular member points above the celestial equator, the declination is positive, and if it points below the celestial equator, the declination is said to be negative.

Celestial bodies move with substantially constant declination, and thus if it is desired to track a celestial body, declination of the control apparatus 10 may be set to the known value. Then if the axis converter is originally pointed toward the celestial body, and thereafter driven at a rate of 15 degrees an hour about the polar axis, the body will be continuously tracked. It is to be noted that no motion occurs about the declination axis.

Connected to the lower polar axis shaft 34 is a bracket member 43. This member is cantileverally supported from the end of the shaft and is maintained in a fixed spatial relationship with respect to the base plate because the shaft 34 is immovable with respect to the base 32. A vertical shaft 44, best shown in the sectional view of Figure 3, is pivotally supported in the bracket 43 such that it passes through a point in space which is midway between the points of support of the ring 38 on the polar axis. Mounted on the vertical shaft 44 is a pivotally supported block 46. Adjacent the upper end of the block 46 is a horizontal shaft 47 which also passes through the mid-point between the supports of the annular ring 38. Pivotally supported to the shaft 47 is the bifurcated member 48. The upper end 49 of the bifurcated member 48 is pivotally supported at the mid point of the semi-annular member 39. The block 46 is hollow and contains suitable electrical pick-off means. As shown in Figure 3, a servo mechanism 53 is connected to the shaft 47 and gives an electrical output which is a function of the angular displacement of the bifurcated member 48 from the horizontal. Connected to the vertical axis 44 is a vertical servo mechanism 57 which converts the angular position of the shaft into electrical information. Electrical conductors 55 and 56 are connected, respectively, to servo mechanism 53 and 57 and pass through the bracket 43 and the hollow shaft 34. Thus the electrical information derived from the servo mechanisms 53 and 57 is available externally of the axis converter.

Geared to the upper end of the polar shaft 36 is a suitable driving means 58 such as an electric motor. The speed of this motor is variable and may be very accurately adjusted to drive the polar shaft 15 degrees per hour. This corresponds to the speed of rotation of the earth about its axis. The apparent motion of a celestial body when observed from the earth is also 15 degrees per hour (360 degrees divided by 24 hours).

The axis converter above described may be relatively small and light since its only function is to convert the polar-declination positions to an alt-azimuth electrical signal. For example, the controlling mechanism may be located at a remote position from the controlled device. The large controlled device will usually be placed upon some vantage point.

The electrical signal picked-off the vertical axis 44 of the controlling apparatus is furnished through the conductor 56 to the servo mechanism 29 which controls the vertical driving motor 19 of the controlled apparatus. Likewise, electric signals picked off the horizontal axis 47 of the controlling device are furnished by leads 55 to the servo 31 of the base plate 16 which in turn controls the horizontal driving motor 30.

In operation, the celestial body to be tracked is chosen and its declination and hour angle calculated or observed. The declination angle is set by rotating the semi-annular member 39 to the correct angle manually or otherwise. The driving means 58 is actuated until the hour angle corresponds to that of the celestial body. The speed of the motor may be controlled in a well-known manner.

The driving means 58 is then adjusted to drive the polar axis at a speed of fifteen degrees per hour in a clockwise direction (when looking down from the upper pivot point of the ring 38). With the axis converter thus set to continuously track the celestial body, the servo mechanisms 53 and 57 mounted to the vertical and horizontal axes of the controlling device will furnish information to the controlled apparatus until it has a vertical and horizontal position corresponding to those of the controlling unit. The massive controlled unit will then remain pointed toward the celestial body as long as the controlling unit is tracking correctly.

It is thus seen that this invention provides means for controlling an alt-azimuth mounted device so that it will track a celestial body by means including a relatively small axis-converting mechanism.

Although this invention has been described with respect to preferred embodiments thereof, it is not to be so limited since changes and modifications may be made therein which are within the full intended scope of the invention as defined by the appended claims.

I claim:

1. An axis converter comprising a first shaft mounted substantially parallel to the polar axis, on a base plate, a substantially annular member pivotally supported on said first shaft, a semi-annular member pivotally supported on said annular member at the mid-point between the pivot points of said annular member, a second vertical shaft pivotally supported in said first shaft, a block member pivotally supported on said second shaft, an elevation shaft extending horizontally through said block member, lever means extending from said horizontal shaft to the mid-point of said semi-annular member, first electrical pickoff means connected to said vertical shaft, and second electrical pickoff means connected to said horizontal shaft.

2. An axis converter for controlling apparatus mounted on an alt-azimuth support system comprising a generally cresent shaped support member, a polar shaft supported in said support member, a ring rotatably supported on said polar shaft, a declination half-ring pivotally supported at the midpoints of said first ring, an azimuth axis supported from said polar axis and placed concentrically within said first ring, an elevation shaft-carrying means pivotally supported on said azimuth axis, an elevational shaft passing through said shaft carrying means, a lever pivotally supported on said elevational shaft and extending to the mid-point of said declination half-ring, elevational pickoff means connected to said elevational shaft, azimuth pickoff means connected to said azimuth shaft, and the outputs of the elevational and azimuth pickoff means fed to control means on the controlled apparatus.

3. An axis converter for changing from a polar axis system to an alt-azimuth axis system in order to control an alt-azimuth mounted structure comprising, a generally crescent shaped polar axis supporting member, a polar shaft pivotally supported in said member, driving means connected to said polar shaft for imparting rotary motion thereto, a polar ring mounted on said polar shaft, a declination half-ring mounted on the polar ring, azimuth supporting means connected to said polar shaft, an azimuth shaft mounted in said azimuth supporting means, an elevational axis supporting means carried on said azimuth shaft, an elevational shaft pivotally supported in said elevational supporting means, a lever connected to said elevation shaft and extending to a mid-point of said declination half-ring, first electrical pickoff means on said elevation shaft, second electrical pickoff means on said azimuth shaft, first conducting means connected to said first pickoff means and supplying a signal to elevational driving means on said alt-azimuth mounted structure, and second conducting means connected to the second pickoff means and supplying a control signal to azimuth driving means on said controlled apparatus.

4. Apparatus for controlling a structure mounted on an alt-azimuth system of axis for tracking celestial bodies comprising, an axis converter according to claim 1 connected to said controlled structure such that the elevational first pickoff means supplies a signal to the elevational driving means of the controlled unit, and the azimuth second pickoff means supplies a signal to the azimuth control means of the controlled unit.

5. Means for automatically tracking a celestial body comprising, a controlled apparatus mounted on altitude and elevational axis, an elevational control motor connected to said controlled apparatus to move it about the elevational axis, an azimuth motor connected to the controlled apparatus to move it about the azimuth axis, an axis converting means supplying control signals to the azimuth and elevation control motors comprising, a base member, a ring pivotally supported on said base member with the axis of support parallel to the polar axis, a semi-annular member rotatably supported from the mid-points between the points of pivot of said ring, a cantileverally supported bracket member attached to said base member, a vertical shaft mounted in said bracket member, a block rotatably supported on said vertical shaft, a horizontal shaft supported in said block, a bifurcated member rotatably supported on said horizontal shaft and with its opposite end rotatably connected to the midpoint of said semi-annular member, a driving means connected to said ring to impart rotation thereto, first electrical pickoff means producing an electrical signal proportional to the position of said vertical shaft, second electrical pickoff means producing an electrical signal proportional to the position of said horizontal shaft, the output of said first pickoff means connected to the azimuth motor of said controlled apparatus, and the output of the second pickoff means supplied to the elevational motor of the controlled apparatus.

6. Means for controlling a controlled structure mounted on an elevation and an azimuth axis so that it tracks a body with constant declination comprising, an elevation drive motor connected to the controlled apparatus to move it about the elevation axis, an azimuth drive motor connected to the controlled apparatus to move it about the azimuth axis, an axis converter comprising, a base member, a polar shaft supported in said base member, a ring rotatably supported on the polar shaft, a semi-annular member rotatably supported on the ring intermediate the pivot points of the ring member, a vertical shaft supported on the base member and extending within the confines of said ring, a block mounted on said vertical shaft, a horizontal shaft mounted in said block, a bifurcated member mounted on said horizontal shaft, the opposite end of said bifurcated member attached to the mid-point of the semi-annular member, first electrical pickoff means connected to said vertical shaft, second electrical pickoff means connected to said horizontal shaft, the elevation motor of the control apparatus receiving an input from the second pickoff means, and the azimuth motor of the control apparatus receiving an input signal from the first pickoff means.

7. Apparatus according to claim 6 wherein a driving means is connected to said ring to move it at a constant rate corresponding to the movement of a celestial body about the polar axis.

IRVIN H. GERKS.

REFERENCES CITED

The following references are of record in the file of this patent:

UNITED STATES PATENTS

| Number | Name | Date |
|---|---|---|
| 703,139 | Lawless | June 24, 1902 |
| 913,051 | Pope | Feb. 23, 1909 |
| 2,108,260 | Harris | Feb. 15, 1938 |
| 2,466,225 | Gee | Apr. 5, 1949 |